Apr. 24, 1923.
E. H. SHERBONDY
UNIVERSAL JOINT
Filed April 9, 1920
1,452,530
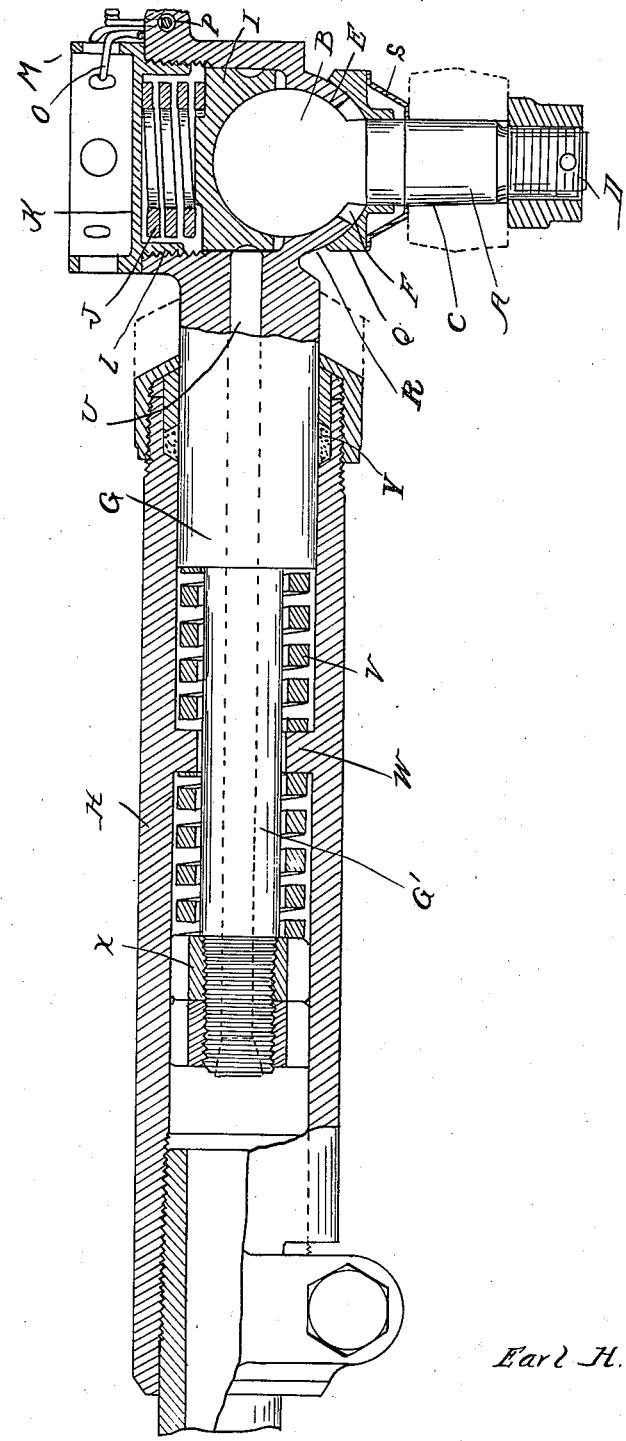
Inventor
Earl H. Sherbondy
By Whittemore Hulbert & Whittemore
Attorneys Patented Apr. 24, 1923.

1,452,530

UNITED STATES PATENT OFFICE.

EARL H. SHERBONDY, OF DETROIT, MICHIGAN, ASSIGNOR TO SIDNEY D. WALDON, OF DETROIT, MICHIGAN.

UNIVERSAL JOINT.

Application filed April 9, 1920. Serial No. 372,643.

*To all whom it may concern:*

Be it known that I, EARL H. SHERBONDY, a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints, more particularly designed for use in rod connections, such for instance as used in the steering mechanism of a motor vehicle. It is the object of the invention; first, to maintain a lubricant and water-proof seal between the cooperating parts; second, to provide for automatic adjustment to take up all backlash; and third, to provide for continuous lubrication.

In the drawings:

The figure is a sectional elevation of a rod for a motor vehicle steering gear, showing my improved universal joint in engagement therewith.

A is one of the members of the universal joint, which as shown is a pin having a spherical head B and tapering shank portions C terminating in a threaded end portion D. E is a socket member for engaging the spherical head B and which is apertured at F to provide for the passage of the shanks C with sufficient clearance for the maximum amount of universal movement. The socket E is semi-spherical and is formed in a member having a laterally extending shank G, which is suitably connected with the rod H. The axis of the shank G is substantially perpendicular to the axis of the pin A, so that stresses produced by the pulling or pushing of the shank will be transmitted to the spherical head B equatorially thereof. The bearing is completed by a semi-spherical socket member I, which engages a recess in the member E of sufficient diameter for the entrance of the spherical head B. The member I is held in engagement with the spherical head by the pressure of a spring J, the opposite end of which seats against a cap member K and a threaded nipple L for engaging a correspondingly threaded portion of the recess. M is a cylindrical flange projecting outward from the cap apertured for the passage of a locking member O, which also engages an aperture in an ear P on the socket member E.

With the construction as thus far described, the spring J will hold the socket members I and E in contact with the spherical head B and as the stresses transmitted from the shank G to the pin A are transverse to the direction of pressure of the spring, there will be little tendency for the bearings to yield. To retain the lubricant in the socket, there is provided a spherical shoe member Q, which is apertured to fit the shanks C of the pin A and which engages an outer spherical face R concentric with the head B and socket E. The shoe is yieldably pressed against this face by a spring S, which may abut against the member F to which the pin is attached. With this construction any lubricant which collects in the clearance space surrounding the shank C will be held from escape by the shoe Q and in the same manner water is excluded from this clearance space and from the socket by said shoe.

To provide a continuous supply of lubricant, the rod H is preferably formed hollow to constitute a lubricant container and a central passage U through the shank G will conduct the lubricant from the hollow rod to the socket.

Where the construction is used upon rods for steering gears, there is a certain amount of longitudinal oscillation, due to the flexing of the supporting springs of the vehicle chassis and which would cause a slight oscillation or wobbling of the wheels. To avoid this, the shank G is slidably engaged with the hollow rod H and is yieldably connected thereto by relatively heavy springs V surrounding a reduced portion G' of the shank and abutting against opposite sides of a bearing W within the rod. Nuts or collars X engaging a threaded end of the shank G' serve to hold the springs V under sufficient tension so that the amount of yielding is relatively small. This, however, is enough to take care of quick oscillations, due to the flexing of the vehicle springs. Leakage of oil between the slidable shank G and the rod is prevented by a stuffing gland Y at the outer end of the rod.

What I claim as my invention is:

1. In a universal joint, the combination with a member having a shank and a spherical head, of a member apertured for the passage of said shank therethrough and provided with a semi-spherical socket bearing at one end of said aperture for engaging said spherical head, a bearing member for the opposite side of said head, said apertured member having an outer spherical face concentric with said head, a segmental spherical shoe sleeved on said shank and engaging said outer spherical face forming a seal therefor, and means for resiliently pressing said shoe against said outer spherical face.

2. A universal joint comprising two members having shanks extending in directions transverse to each other, one of said members being provided with a spherical head and the other being apertured transversely to its shank for the passage of the shank of the first-mentioned member and provided with a semi-spherical seat at one end of said aperture for engagement with said spherical head, means for closing said aperture and pressing said spherical head against said seat, a shoe having a segmental spherical bearing sleeved upon the shank of said first-mentioned member and externally engaging said semi-spherical seat, and means for resiliently pressing said shoe against said seat.

3. A universal joint comprising two members having shanks extending in directions transverse to each other, one of said members having a spherical head and the other being recessed to receive said head with a semi-spherical bearing at one end of said recess apertured for the passage of the shank of the first-mentioned member with a clearance for limited universal movement, a bearing in said recess for engaging the opposite side of said spherical head, a resilient member for pressing against said bearing, a cap for closing said recess forming an abutment for said resilient member, a shoe sleeved upon the shank of said first-mentioned member and having a segmental spherical bearing for externally engaging said semi-spherical bearing, a member to which the shank of said first-mentioned member is secured, and resilient means between said last-mentioned member and said shoe for pressing the same to its seat.

4. A universal joint comprising two members having shanks extending in directions transverse to each other, one of said members having a spherical head and the other being recessed and provided with a semi-spherical bearing for engaging said head with a central aperture through said bearing for the passage of the shank, means for closing said recess, means within the enclosed recess for pressing said spherical member against its seat, a shoe sleeved upon the shank of the member having the spherical head and provided with a segmental spherical bearing for externally engaging said semi-spherical bearing, means for resiliently pressing said shoe against said bearing, and a lubricant reservoir having a feeding passage through the shank of the recessed member leading to said spherical head and bearing.

In testimony whereof I affix my signature.

EARL H. SHERBONDY.